(12) United States Patent
Wagner et al.

(10) Patent No.: US 9,845,052 B2
(45) Date of Patent: Dec. 19, 2017

(54) ELECTRONIC CAMERA AND MOTOR VEHICLE USING SUCH A CAMERA

(71) Applicant: GM GLOBAL TECHNOLOGY OPERATIONS LLC, Detroit, MI (US)

(72) Inventors: Oliver Wagner, Grosse-Gerau (IT); Stefan Bauer, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 14/554,991

(22) Filed: Nov. 26, 2014

(65) Prior Publication Data
US 2015/0156427 A1 Jun. 4, 2015

(30) Foreign Application Priority Data
Nov. 30, 2013 (DE) .................. 10 2013 020 203

(51) Int. Cl.
| | | |
|---|---|---|
| H04N 7/18 | (2006.01) | |
| B60R 1/00 | (2006.01) | |
| G01J 5/08 | (2006.01) | |
| H04N 5/225 | (2006.01) | |
| H04N 5/238 | (2006.01) | |
| H04N 5/33 | (2006.01) | |

(52) U.S. Cl.
CPC .............. *B60R 1/00* (2013.01); *G01J 5/0806* (2013.01); *H04N 5/2254* (2013.01); *H04N 5/238* (2013.01); *H04N 5/332* (2013.01); *B60R 2300/106* (2013.01); *B60R 2300/8053* (2013.01)

(58) Field of Classification Search
USPC ................................................. 348/148, 159
See application file for complete search history.

(56) References Cited

U.S. PATENT DOCUMENTS

| | | | |
|---|---|---|---|
| 5,338,481 A | 8/1994 | Wu et al. | |
| 5,926,238 A | 7/1999 | Inoue et al. | |
| 7,109,470 B2 | 9/2006 | Koehler | |
| 7,460,161 B2 | 12/2008 | Pallaro et al. | |
| 7,619,680 B1 * | 11/2009 | Bingle | B60R 11/04 348/342 |
| 8,159,533 B2 | 4/2012 | Cheng | |
| 2005/0083431 A1 | 4/2005 | Tsutsumi | |
| 2005/0104998 A1 | 5/2005 | Udaka | |
| 2009/0091710 A1 * | 4/2009 | Huebner | G03B 21/14 353/28 |

(Continued)

FOREIGN PATENT DOCUMENTS

| | | |
|---|---|---|
| DE | 3429410 A1 | 2/1986 |
| DE | 3817946 A1 | 11/1989 |

(Continued)

*Primary Examiner* — Nigar Chowdhury
(74) *Attorney, Agent, or Firm* — Lorenz & Kopf, LLP

(57) ABSTRACT

An electronic camera system is operable in a first operating state, in which a video signal delivered by the image sensor is based on the detection of visible light only, and a second operating state, in which a video signal delivered by the image sensor is at least in part based on the detection of infrared light. The camera system includes an electronic image sensor that is sensitive to visible light and infrared light, a lens system that is transparent to visible light and infrared light and serves for projecting an image onto the image sensor and a filter assembly arranged in front of the image sensor.

16 Claims, 1 Drawing Sheet

(56) References Cited

U.S. PATENT DOCUMENTS

| | | | |
|---|---|---|---|
| 2011/0134293 A1* | 6/2011 | Tanaka | G02B 7/34 348/280 |
| 2013/0100321 A1 | 4/2013 | Schmid et al. | |
| 2013/0147965 A1* | 6/2013 | Gao | G03B 11/00 348/164 |
| 2014/0043478 A1* | 2/2014 | Burton | H04N 5/2254 348/143 |
| 2015/0237270 A1* | 8/2015 | Atif | H04N 5/332 348/164 |

FOREIGN PATENT DOCUMENTS

| | | |
|---|---|---|
| DE | 19801884 A1 | 7/1999 |
| DE | 10220825 A1 | 7/2003 |
| EP | 2136403 A2 | 12/2009 |

\* cited by examiner

ELECTRONIC CAMERA AND MOTOR VEHICLE USING SUCH A CAMERA

CROSS REFERENCE TO RELATED APPLICATION

This application claims priority to German Patent Application No. 102013020203.5 filed Nov. 30, 2013, which is incorporated herein by reference in its entirety.

TECHNICAL FIELD

The present disclosure relates to an electronic camera for a motor vehicle with image sensor that is sensitive to visible light and infrared light such that the camera is switchable between a first operating state, in which a video signal delivered by the image sensor is based on the detection of visible light only, and a second operating state, in which a video signal delivered by the image sensor is at least in part based on the detection of infrared light.

BACKGROUND

Electronic cameras are used in various driver assistance systems for motor vehicles. EP 1 418 089 A2 discloses an electronic camera for use in a motor vehicle, in which the surface of a photosensitive sensor is divided into different areas that are respectively assigned to different applications such as capturing images of the surroundings, detecting fog, rain, etc.

The more numerous the applications, for which the sensor of this conventional camera should be used, the larger the required surface of the sensor and the space required for various optical systems for directing light at the sensor. The available installation space for such a camera in a conventional motor vehicle is preferably located in an area on the central upper edge of the windshield between the windshield and a rear-view mirror mounted in the passenger compartment. A camera installed at this location should be as compact as possible such that it does not unnecessarily restrict the view of the driver through the windshield.

SUMMARY

In accordance with the present disclosure a camera having compact dimensions that can be used for different applications in motor vehicles is provided. According to an embodiment of the present disclosure, an electronic camera includes an electronic image sensor that is sensitive to visible light and infrared light. The camera also includes a lens system that is transparent to visible light and infrared light and serves for projecting an image onto the image sensor. A filter assembly is arranged in front of the image sensor. The camera is operable for switching between a first operating state, in which a video signal delivered by the image sensor is based on the detection of visible light only, and a second operating state, in which a video signal delivered by the image sensor is at least in part based on the detection of infrared light.

The realization of the switch-over between the two operating states depends on the design of the filter assembly. According to a first embodiment, the filter assembly may include a filter having a plurality of filter elements, wherein each of the filter elements transmits light to just one of several surface areas of the image sensor. The filter elements include filter elements of a first type that are transparent to infrared light, and filter elements of a second type that are impervious to infrared light. In such a filter, a switch-over between the operating states of the camera affected with only the image sensor and requires no control of the filter assembly. A video signal that is exclusively based on the detection of visible light can be obtained in the first operating state because only the pixels of the image sensor that are illuminated by means of the infrared-impervious filter elements of the second type are read out in the first operating state. All pixels or only the pixels that are illuminated by means of the infrared-transparent filter elements of the first type can be selectively evaluated in the second operating state. The filter elements of the first and second type may be arranged in a periodic grid, and in this way uniformly distributed over the image plane of the lens system.

According to one embodiment, the filter assembly may include a filter body that is impervious to infrared light and can be moved between an effective position in the beam path of the camera that corresponds to the first operating state and an ineffective position that corresponds to the second operating state. In this embodiment, one and the same pixel of the image sensor can be illuminated or not illuminated with infrared light depending on the position of the filter body. A video signal with a relatively high resolution can therefore be obtained.

According to one embodiment, the filter assembly may include a filter body with electrically controllable transparency to infrared light. A filter body of this type does not have to be moved during a switch-over between the operating states of the electronic camera such that it is also not required to keep available space outside the beam path, into which the filter body can yield in the second operating state. The filter body particularly may include a material, the double refraction of which is dependent on an electric field acting thereupon. The phase shift between differently polarized components of the light induced with the aid of such a controlled double refraction can be used for selectively suppressing different spectral components of the light by means of suitable polarization filters.

The electronic camera may furthermore include an ambient light sensor and a control unit that adjusts the operating state based on the ambient brightness detected by the ambient light sensor. In dark surroundings, such a control unit will typically select the second operating state because an informative image for a viewer cannot be generated with visible light only in this case. The ambient light sensor may include the actual image sensor, wherein output signals of individual pixels of the image sensor can be used, in particular, for generating the video signal, as well as a signal that is representative of the ambient brightness. If the ambient brightness decreases to such a degree that a usable video signal can no longer be generated based on visible light only, this can be readily detected based on the output signals of the pixels.

If the filter body is transparent to visible light in both operating states, it is also possible to detect an increase in the ambient brightness, which would make it possible to switch back to the capture of images with visible light only, based on the output signals of the pixels of the image sensor when the camera is in the second operating state.

Different refractive indices of conventional optical materials for visible light and infrared light generally lead to a given lens system being unable to simultaneously project visible light and infrared light onto an image sensor in a sharply defined fashion. In order to also generate a sharp image in the second operating state, an actuator may be provided that varies the distance between the lens system and the image sensor depending on the selected operating state. If the second operating state is only selected in the above-described fashion when the visible light in the surroundings does not suffice for deriving a usable video signal, the fact that visible light cannot be simultaneously projected in a sharply defined fashion when the lens system is focused for infrared light does not lead to any disturbing effects. However, if the second operating state should also be selected in situations, in which the amount of visible light in the surroundings suffices for generating a usable video signal, it would also be possible that the filter body blocks the visible light or at least a short-wave portion thereof in the second operating state.

Another aspect of the present disclosure concerns a motor vehicle with an electronic camera of the above-described type that can be used in a night vision driver assistance system, as well as in at least one other assistance system that is based on the evaluation and/or display of images obtained by means of visible light.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
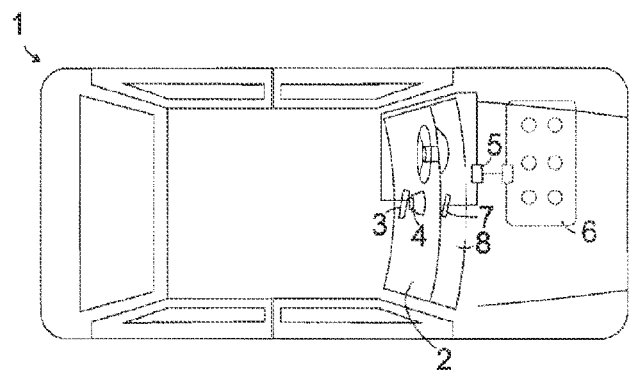
FIG. 1 shows a schematic top view of a vehicle with a multipurpose camera according to the present disclosure.

In the vehicle 1 illustrated in FIG. 1, an electronic camera 4 is arranged on the inner side of a windshield 2, namely between this windshield and a rear-view mirror 3. A lens system of the camera 4 is directed at the traffic space situated in front of the vehicle 1 through the windshield 2. The camera 4 is connected to a control unit 5 that can fulfill different functions depending on the operating state of the camera 4.

In a first operating state of the camera 4, in which this camera 4 delivers a video signal that is exclusively based on the detection of visible light to the control unit 5, the control unit 5 may function, for example, as a distance monitoring system that assesses the distance from a leading vehicle based on the received video signal and activates an engine 6 or, if so required, not-shown brakes in accordance with the result of the assessment.

The control unit 5 may alternatively or additionally also fulfill other driver assistance functions based on the images delivered by the camera 4 such as, for example, the detection of traffic signs and their reproduction on a display screen 7. The display screen 7 is mounted in the passenger compartment of the vehicle 1 at a location that is clearly visible for the driver such as, e.g., on a dashboard 8 of the vehicle 1.

In order to fulfill another driver assistance function, namely a night vision function that informs the driver of the presence and, if applicable, the position of heat sources, particularly persons and warm-blooded animals, under insufficient ambient light conditions, the camera 4 also needs to be sensitive to the infrared radiation that originates from these heat sources and is invisible to the naked eye. The silicone-based image sensors used in conventional electronic cameras are by nature not only sensitive to visible light, but also to radiation in the near-infrared range. However, a filter arranged in front of the image sensor traditionally prevents this infrared radiation from reaching the image sensor because an object emitting significant infrared radiation would otherwise appear very bright in the image regardless of its brightness perceived with the naked eye and such a display that deviates from the human perception complicates the recognition of a displayed object for the viewer.

Figure 2:
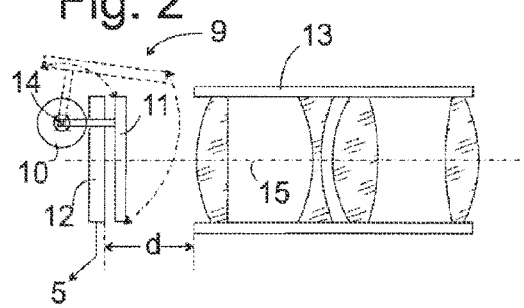
FIG. 2 shows a schematic section through a camera according to a first embodiment of the present disclosure along the optical axis.

FIG. 2 shows a schematic section through an electronic camera 4 according to a first embodiment of the present disclosure. In this camera 4, a filter assembly 9 includes an infrared-impervious filter body 11 and an actuator such as, e.g., an electric motor 10 that moves the filter body 11 between an effective position in the beam path of the camera 4 drawn with continuous lines, namely between the image sensor 12 and the lens system 13, and an ineffective position drawn with broken lines, in which the filter body 11 is located outside the beam path. In this case, the filter body 11 can be pivoted about an axis 14 in order to be accommodated in the ineffective position without significantly increasing the space requirement of the camera 4 transverse to its optical axis 15.

In order to minimize reflections, it may be advantageous if the filter body 11 directly contacts the surface of the image sensor 12 in the effective position. In contrast to the illustration in FIG. 2, the pivoting axis 14 of the filter body 11 would have to extend adjacent to an edge thereof in this case and the distance d between the image sensor 12 and the lens system 13 would have to be at least identical to the dimension of the filter body 11 transverse to its pivoting axis 14 such that it can reach its ineffective position without colliding with the lens system 13.

In the embodiment illustrated in FIG. 2, the filter body 11 is in the effective position slightly spaced apart from the image sensor 12 in order to allow a pivoting motion about the axis 14 extending behind the image sensor 12. In this way, the distance between the image sensor 12 and the lens system 13 can be smaller than the dimension of the filter body 11.

In a first operating state of the camera 4, in which the filter body 11 is in the effective position in the beam path, the camera 4 can be used for the above-described applications such as, e.g., distance monitoring, traffic sign recognition, etc.; in the second operating state, in which the filter body 11 is in the ineffective position, it is also sensitive to infrared radiation and therefore can fulfill a night vision function.

Figure 3:
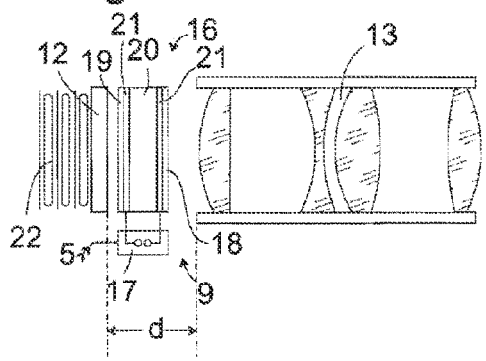
FIG. 3 shows a schematic longitudinal section analogous to FIG. 2 through a second embodiment.

FIG. 3 shows a schematic section through a camera 4 according to a second embodiment of the present disclosure. The image sensor 12 and the lens system 13 are identical to the embodiment according to FIG. 2. In this case, however, the filter assembly 9 does not feature a movable filter body 11, but rather a stationary filter body 16 with electrically controllable transmission characteristic, as well as a voltage source 17 generating an electric field that is variable under the control of control unit 5 at the location of the filter body 16. The filter body 16 may include, for example, a layer of a liquid crystal material 20 enclosed between structured sheets 21 and polarizing filters 18, 19 that induce an orientation of the molecules of the liquid crystal material 20 and are provided with electrically conductive transparent layers in accordance with the technology known from LCD displays. The layer thickness of the liquid crystal material 20 may be greater than in conventional LCD displays such that the double refraction of the liquid crystal material 20, which can be varied under the influence of an electric field generated between the electrically conductive layers of the sheets 21, can induce a transit time difference of more than one oscillation period between the ordinary and the extraordinary ray of the transmitted light. Such a substantial transit time difference results in the phase difference between the ordinary and the extraordinary ray to be highly dependent on the wavelength of the light. This makes it possible to orient the polarizing filters 18, 19 relative to one another in such a way that visible light is essentially transmitted and infrared light is blocked at a first value of the electric field intensity that corresponds to the first operating state of the camera whereas visible light, as well as infrared light, is transmitted at a second value of the field intensity that corresponds to the second operating state.

A filter assembly, the transmission of which is high for visible light and low for infrared light at a first value of the field intensity and high for infrared light and for visible light at a second value of the field intensity, can also be realized with the design according to FIG. 3. However, since the night vision function is in practical applications only used when the visible light in the surroundings of the vehicle 1 does not suffice for a reliable detection of persons and animals by the driver, a purposeful suppression of the visible light is generally not required in the second operating state of the camera 4.

An actuator, particularly a piezoelectric element 22, may be provided behind the image sensor 12 in order to vary the distance d between the image sensor 12 and the lens system 13. The piezoelectric element 22 makes it possible to compensate different refractive indices of the lenses of the lens system 13 and different positions of the image plane of the lens system 13 for visible light and for infrared light resulting thereof, namely in that the control unit 5 respectively activates the piezoelectric element 22 in such a way that the image sensor 12 is located in the image plane of the visible light in the first operating state and in the image plane of the infrared light in the second operating state. In this way, sharply defined images can be obtained in both second operating states.

Although the piezoelectric element 22 is only illustrated in connection with the embodiment according to FIG. 3, one skilled in the art should recognize that it (or an equivalent actuator) can be used analogously in the other embodiments described herein.

Figure 4:
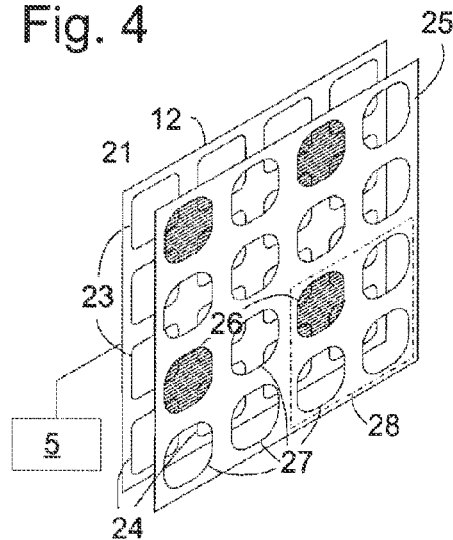
FIG. 4 shows a schematic perspective view of parts of an image sensor and a filter assembly according to a third embodiment of the present disclosure.

FIG. 4 shows a perspective view of part of the image sensor 12 and a filter assembly 9 arranged in front of the image sensor 12 according to a third embodiment of the present disclosure. The lens system of the camera 4 is not illustrated in FIG. 4, but once again realized identical to FIGS. 2 and 3. The image sensor 12 conventionally includes a matrix arrangement of elementary photo detectors or pixels 23, 24 that can be successively read out in order to extract the video signal from the control unit 5. This figure shows an exemplary matrix with four lines and four columns of pixels; the number of lines and columns is significantly higher in practical applications.

A filter 25 arranged between the image sensor 12 and the lens system is composed of a plurality of filter elements 26, 27 that are respectively assigned to one of these pixels 23, 24. The filter elements 26, 27 are arranged in a periodic grid, the elementary cells 28 of which respectively include two-times-two filter elements, namely one filter element 26 that is transparent to infrared light and three infrared-impervious filter elements 27 in this case. The filter is neither movable nor is the transmission characteristic of its individual filter elements 26, 27 variable. In order to generate a video signal that is based on the detection of visible light only in the first operating state of the camera, it suffices if the control unit 5 reads out only the pixels 24 illuminated by the infrared-impervious filter elements 27. In the second operating state, all pixels 23, 24 can be read out, but the video signal can also be derived from the IR-sensitive pixels 23 illuminated by the filter elements 26 only.

In the described example, the filter elements 27 are equally transparent for all three primary colors red, green and blue such that the control unit can derive from their output signals a black-and-white video signal, the brightness of which essentially corresponds to the brightness of vari-colored objects perceived by the human eye; the filter elements 27 preferably are transparent over the entire visible spectral range. In the illustrated arrangement with three filter elements 28 per elementary cell 29, it would also be possible to respectively replace the three filter elements 28 with a filter element for one of the three primary colors and to obtain a color video signal by separately reading out the pixels illuminated by these filter elements.

The control unit 5 may derive an average brightness value that is representative of the ambient brightness from the signals of the pixels 24 illuminated by the filter elements 27. The control unit 5 decides on the operating state of the camera 4 based on a comparison of this brightness value with a predefined limiting value: if the ambient brightness lies above the limiting value, assistance functions that are based on the detection of visible light such as, e.g., traffic sign recognition can be realized and the control unit 5 selects the first operating state in order to deliver a video signal that is based on the detection of visible light. If the average brightness lies below the limiting value, it can be assumed that the night vision function is the most useful function for the driver and the control unit 5 selects the second operating state in order to output a video signal that is essentially based on the detection of infrared light on the display screen 7.

A corresponding automatic switch-over between the operating states can also be realized in the cameras according to FIGS. 2 and 3. An average brightness signal that is representative of the ambient brightness can also be derived from the signals of the individual pixels of the image sensor 12 in this case in order to respectively move the filter body 11 into the ineffective position or switch the filter body 16 transparent to infrared light if the ambient brightness falls short of a limiting value. A sufficient hysteresis should be provided for the comparison with the limiting value so as to prevent the camera from being switched back into the first operating state due to an increase in the detected ambient brightness caused by the admission of infrared light to the image sensor 12. If the filter body 11 is transparent to visible light or the filter body 16 is also transparent to visible light in the IR-transparent state, an actual increase of the visible light in the surroundings leads to an increase of the average brightness signal such that an automatic switch-back into the first operating state is also ensured.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. An electronic camera comprising:
  an image sensor that is sensitive to visible light and infrared light, the image sensor having a plurality of pixels;
  a lens system that is transparent to visible light and infrared light and serves for projecting an image onto the image sensor; and
  a filter assembly arranged in front of the image sensor and having a plurality of filter elements including a first filtering element that is transparent to infrared light and a second filtering element that is impervious to infrared light, wherein one element of the plurality of filtering elements transmits light to just one of the plurality of pixels;
  wherein the electronic camera is operable in a first operating state, in which an image signal generated by the image sensor is based on the detection of visible light only, and a second operating state, in which the image signal generated by the image sensor is at least in part based on the detection of infrared light.

2. The electronic camera according to claim 1, wherein the second filter elements are transparent to the primary colors of the visible light.

3. The electronic camera according to claim 1, wherein the plurality of filter elements form a periodic grid.

4. The electronic camera according to claim 1, wherein the filter assembly comprises a filter body that is impervious to infrared light and is movable between an effective position in the beam path of the camera and an ineffective position.

5. The electronic camera according to claim 4 further comprising an ambient light sensor and a control unit for selecting the operating state based on the ambient brightness detected by the ambient light sensor.

6. The electronic camera according to claim 5, wherein the filter element includes a material having a double refraction which is dependent on an electric field acting upon the material.

7. The electronic camera according to claim 5, wherein the ambient light sensor comprises the image sensor.

8. The electronic camera according to claim 7, wherein the filter body is transparent to visible light in both operating states.

9. The electronic camera according to claim 1, wherein the filter assembly comprises a filter body including a filter element having electrically controllable transparency to infrared light.

10. The electronic camera according to claim 9 further comprising an ambient light sensor and a control unit for selecting the operating state based on the ambient brightness detected by the ambient light sensor.

11. The electronic camera according to claim 10, wherein the ambient light sensor comprises the image sensor.

12. The electronic camera according to claim 11, wherein the filter body is transparent to visible light in both operating states.

13. The electronic camera according to claim 1, further comprising an ambient light sensor and a control unit for selecting the operating state based on the ambient brightness detected by the ambient light sensor.

14. The electronic camera according to claim 13, wherein the ambient light sensor comprises the image sensor.

15. The electronic camera according to claim 1, further comprising an actuator for varying the distance between the lens system and the image sensor in dependence on the selected operating state.

16. A motor vehicle with an electronic camera according to claim 1.

* * * * *